(12) United States Patent
Kikuchi et al.

(10) Patent No.: US 6,226,437 B1
(45) Date of Patent: May 1, 2001

(54) OPTICAL FIBER RETAINER

(75) Inventors: Kimihiro Kikuchi; Atsunori Hattori; Yoshihiro Someno, all of Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 09/337,103

(22) Filed: Jun. 21, 1999

(30) Foreign Application Priority Data

Jul. 9, 1998 (JP) .................................................. 10-194200

(51) Int. Cl.[7] ........................................................ G02B 6/00

(52) U.S. Cl. .................................. 385/136; 385/93; 385/60

(58) Field of Search .................................. 385/136, 4, 93, 385/60

(56) References Cited

U.S. PATENT DOCUMENTS 4,986,625 * 1/1991 Yamada et al. ...................... 350/96.2
5,745,633 4/1998 Giebel et al. .

* cited by examiner

Primary Examiner—Frank G. Font
Assistant Examiner—Roy M. Punnoose
(74) Attorney, Agent, or Firm—Brinks, Hofer, Gilson & Lione

(57) ABSTRACT

Output drop due to misalignment of the mounting positions of optical fibers between the optical axis direction of laser light and a direction perpendicular to the optical axis direction is prevented. A light guide part 100a of an optical fiber 100 is engaged in a predetermined through hole 19 provided in a bottom wall 18 of a case 11, the light guide part 100a being uncovered by stripping a protective jacket 100b from the tip 100c of the optical fiber 100, whereby an optical filter 30 disposed at a predetermined interval on an extension of the core 100z of the optical fiber 100 and the optical fiber 100 are positioned.

2 Claims, 2 Drawing Sheets

OPTICAL FIBER RETAINER

BACKGROUND OF THE INVENTION

1. Field of the Invention

The present invention relates to an optical fiber retainer used to couple an optical fiber to an optical communication module.

2. Description of the Prior Art

Generally, optical communication modules include light emitting modules, light receiving modules, and connector modules.

A light emitting module, which integrates a laser diode, a lens, and an optical fiber, gathers laser beams emitted from the laser diode by the lens and optically couples them within the optical fiber.

A light receiving module is constructionally the same as the above described light emitting module, except that it includes a photodiode instead of the laser diode of the light emitting module. Laser beams emitted from the optical fiber are gathered by the lens and received in the photodiode disposed at the focus position thereof.

A connector module, which is different from the light emitting module and the light receiving module in that it does not include a laser diode nor a photodiode, simply couples optical fibers. Optical communication modules which enable optical fibers to be inserted and removed are called receptacle-type ones.

In receptacle-type optical communication modules, stable output of laser beams to optical fibers requires accurate positioning of the optical axes of optical fibers with respect to the position at which to couple the light beams.

SUMMARY OF THE INVENTION

The present invention has been made in consideration of the above described problems and its object is to provide a fiber retainer of an optical communication module that enables output drop due to misalignment of the core direction of an optical fiber and a direction perpendicular to the core to be prevented.

A first arrangement for solving the above described problems is to provide an optical fiber retainer comprising a case having a bottom wall and an optical fiber inserted in the case, wherein a light guide part of the optical fiber is engaged in a through hole provided in the bottom wall to position the optical fiber in the case, the light guide part being uncovered by stripping a protective jacket from the tip of the optical fiber.

A second arrangement for solving the above described problems is to bring the end face of the protective jacket into intimate contact with the bottom plate face of the bottom wall.

A third arrangement for solving the above described problems is to provide an optical fiber retainer comprising a case having a bottom wall, a sleeve having a fiber insertion hole inserted within the case, a plate spring, and an optical fiber, wherein the optical fiber whose light guide part is uncovered by stripping a protective jacket from the tip thereof is inserted in the fiber insertion hole, the light guide part is engaged in a through hole provided in the bottom wall, the plate spring engages in the surface of the protective jacket of the optical fiber to prevent the optical fiber from being disconnected, and the sleeve is driven in the insertion direction of the optical fiber to disengage the plate spring from the optical fiber.

DESCRIPTION OF THE PREFERRED EMBODIMENTS

Figure 1:
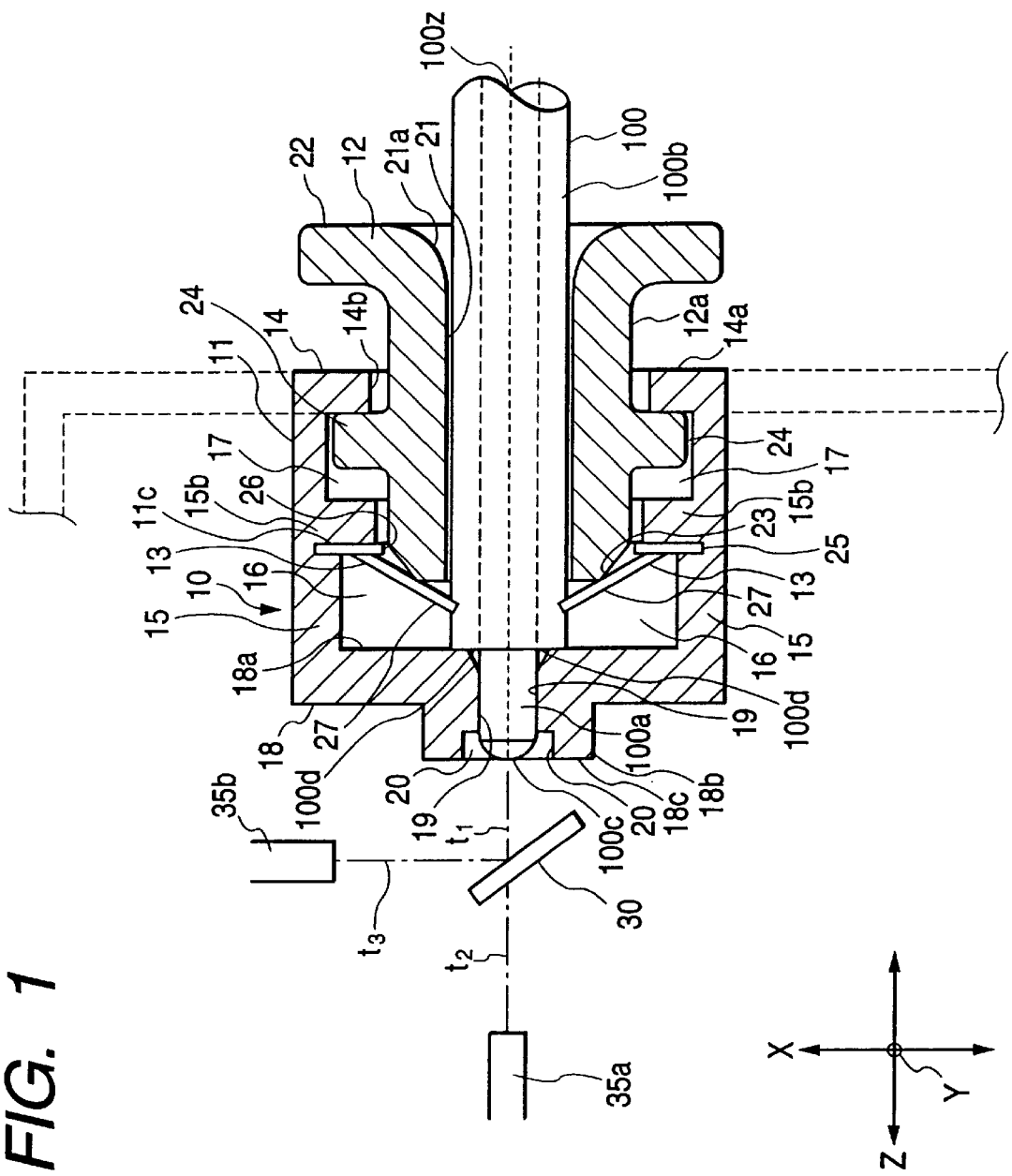
FIG. 1 is a cross sectional view showing an optical fiber retainer according to one embodiment of the present invention.

An optical fiber retainer 10 of a first embodiment of the present invention, as shown in FIG. 1, comprises a roughly cylindrical case 11 closed at one end thereof, a roughly cylindrical sleeve 12 a portion of which is housed within the case 11, and an elastic, metallic plate spring 13 which contacts intimately with the sleeve 12 within the case 11.

An upper wall 14 having a circular mounting hole 14b is formed on the case 11. A bottom wall 18 is formed in opposition to the upper wall 14 of the case 11. A side wall 15 is formed to connect the upper wall 14 and the bottom wall 18.

The inside of the bottom wall 18 is a bottom plate face 18a, which is accurately formed as a mounting reference face for intimate contact with the end of the optical fiber 100.

There is formed at the side wall 15 an anchoring member 15b which is at almost the center between the upper wall 14 on the inner circumferential face of the side wall 15 and the bottom wall 18 and extends inwardly. Forming the anchoring member 15b results in a first cavity 16 being formed between the bottom wall 18 and the anchoring member 15b, and a second cavity 17 being formed between the upper wall 14 and the anchoring member 15b.

At the base of the anchoring member 15b within the first cavity 16 is formed a slot 11c along the inner circumferential face of the side wall 15.

At the center of the bottom wall 18 is accurately formed a through hole 19 through which an optical fiber 100 described later is inserted. Furthermore, at the bottom wall 18 is formed a cylindrical protrusion 18b which extends outwardly (to the left in the figure) beyond the bottom wall 18 about the through hole 19. The end face 18c of the protrusion 18b is opposite to the bottom plate face 18a and flat.

Corners of the bottom wall 18 which face the through hole 19 are tapered. On the other hand, at the end of the protrusion 18b is formed a guide hole 20 cut out from the end face 18c about the through hole 19 by a diameter slightly larger than that of the through hole 19.

At the cylindrical sleeve 12 is formed a fiber insertion hole 21 piercing therethrough about the shaft thereof. In the neighborhood of the insertion hole 21 is provided an external side wall 12a, at one end of which a collared knob 22 extending outwardly from the external side wall 12a is formed. At the other end thereof is formed a throttle 23 which becomes gradually thin toward the tip thereof. A taper 21a is formed at the end of the knob 22 of the external side wall 12a facing the fiber insertion hole 21.

A disconnection preventing member 24 extending outwardly from the outer circumferential face is formed at almost the center between the knob 22 and the throttle 23 of the external side wall 12a.

The sleeve 12 is housed in the case 11, from a mounting hole 14b of which the knob 22 extends outwardly.

The disconnection preventing member 24 of the sleeve 12 is movably disposed between the upper wall 14 and the anchoring member 15b within the second cavity 17.

The plate spring 13 includes a circular, thin metallic substrate 25 and an aperture 26 formed cut out in the central portion thereof. At the edge of the aperture 26 of the substrate 25 are formed a plurality of tongue-shape, elastic lock hooks 27 extending inwardly.

These lock hooks 27 are bent from the edge of the aperture 26 of the substrate 25 on the surface thereof such that the cross section of the lock hooks 27 in the Z-axis direction in the figure is in the shape of "V". On the other hand, the tip of the lock hooks 27 is formed such that the cross section in the board thickness direction thereof is acute.

The circumferential edge of the substrate 25 of the plate spring 13 is secured in engagement with the slot 11c of the case 11. The lock hooks 27 are, at the base thereof, bent toward the bottom wall 18 from the aperture 26 of the substrate 25.

The optical fiber 100 is comprised of a light guide part 100a made of glass, plastic, or the like, and a protective jacket 100b covering the light guide part 100a with resin.

At one end of the optical fiber 100, the outer circumferential face of the light guide part 100a is uncovered to a predetermined length with the protective jacket 100b.

An end face 100d is formed perpendicular to the outer circumferential face of the protective jacket 100b and is accurately chamfered as a mounting reference face for intimate contact with the bottom plate face 18a of the case 11.

The tip 100c of the light guide part 100a is spherically or non-spherically lens processed.

An optical filter 30, which is an optical part, has a plurality of different types of dielectric films laminated and is a branching filter that transmits or reflects light of some specific wavelength bands.

The optical filter 30 is a predetermined distance t1 away from the flat end face 18c of the case 11 on an extension of the core 100z of the optical fiber 100 secured to the case 11, and is disposed, counterclockwise tilted about 45 degrees with respect to the X axis in the figure.

Light receiving elements 35a and 35b are formed of photodiodes, and the light receiving element 35a is disposed a predetermined distance t2 away from the optical filter 30 on an extension of the core 100z of the optical fiber 100. The light receiving element 35b is disposed at a position in which light bent at right angles by the optical filter 30 is incident, a predetermined distance t3 away from the optical filter 30.

The optical filter 30 and the light receiving elements 35a and 35b are housed in the body indicated in the dotted lines in the figure, which constitutes an optical communication module, and are integrated with the case 11 constituting the optical fiber retainer 10. The mounting position of the optical filter 30 and the case 11, and the positions of the optical axes between the optical filter 30 and the light receiving elements 35a and 35b are accurately adjusted, respectively.

Next, a description will be made of a method of securing the optical fiber 100 to the optical fiber retainer 10 thus constructed.

By inserting the optical fiber 100 to the sleeve 12 from the outside while using the taper 21a as a guide, the optical fiber 100 advances while its position is being controlled by the fiber insertion hole 21, the tips of the lock hooks 27 are pushed out in the direction of insertion, the interval between the tips is widened, and the optical fiber 100 is smoothly inserted in the case 11 while the tips of the lock hooks 27 are making intimate contact with the outer circumferential face of the protective jacket 100b of the optical fiber 100. The light guide part 100a of the optical fiber 100 is inserted in the through hole 19 tapered in one end.

The end face 100d of the protective jacket 100b hits the bottom plate face 18a within the case 11, where insertion of the optical fiber 100 to the case 11 stops, and the protective jacket 100b of the optical fiber 100 is pressured by the tips of the lock hooks. At this time, the tip 100c of the light guide part 100a of the optical fiber 100 is disposed in the guide hole 20.

When a removal force is applied to the optical fiber 100, that is, when a force to remove the optical fiber 100 from the case 11 is applied, the acute tips of the lock hooks 27 engage in the outer circumferential face of the protective jacket 100b, preventing the optical fiber 100 from being removed.

With this construction, light transmitting through the light guide part 100a of the optical fiber is gathered and emitted toward the optical filter 30 from the tip 100c serving as a lens. Of the emitted light, light of a predetermined wavelength band is incident on the light receiving element 35a through the optical filter 30, and light of other wavelength bands reflect from the optical filter 30 and is incident on the light receiving element 35b. Light thus divided toward the light receiving elements 35a and 35b is converted to electric signals by the light receiving elements 35a and 35b.

In this way, since the outer circumferential face of the light guide part 100a of the optical fiber 100 is correctly engaged in the through hole 19 of the case 11, the optical fiber 100 can be accurately positioned in directions perpendicular to the insertion direction thereof, namely, the X-axis and Y-axis directions.

The light guide part 100a of the optical fiber 100 is uncovered to a predetermined length with the protective jacket 100b, and the end face 100d of the protective jacket 100b accurately chamfered is brought into intimate contact with the bottom plate face 18a of the case 11, whereby the optical fiber 100 can be accurately positioned in the insertion direction thereof, namely, the Z-axis direction. In other words, the tip 100c of the light guide part 100a of the optical fiber 100 can be accurately positioned up and down, back and forth, and left and right (X, Y, and Z axes) within the case 11.

Since the case 11 securing the optical fiber 100, and the optical filter 30 are positioned in advance, light emitted from the optical fiber 100 can arrive correctly in the optical filter 30.

The optical fiber 100 secured to the case 11 is detached by pressing the sleeve 12 in the reverse direction of removal within the mounting hole 14b. Briefly, holding the knob 22, press in the disconnection preventing member 24 all the way to the anchoring member 15b. The throttle 23 formed at the tip of the sleeve 12 opens the tips of the lock hooks 27, disengaging the tips of the lock hooks 27 from the protective jacket 100b of the optical fiber 100. In this way, by pressing in the sleeve 12 within the case 11, the optical fiber 100 can be removed from the case 11.

Next, a description will be made of an optical communication module using an optical fiber retainer 10 of the present invention.

Figure 2:
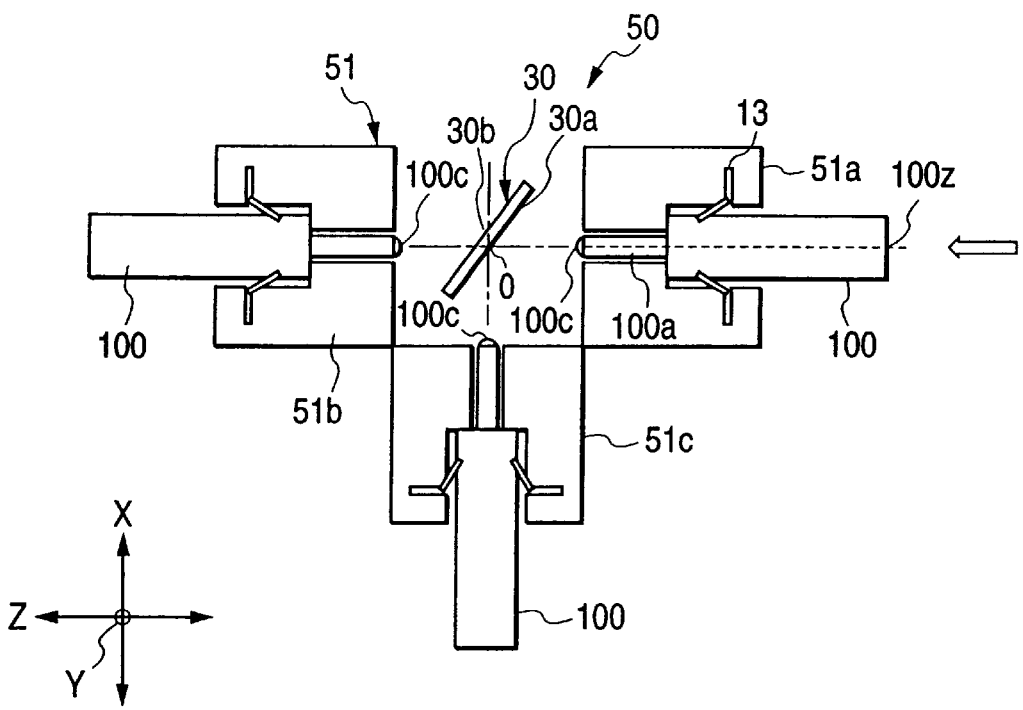
FIG. 2 is a schematic cross sectional view showing a configuration of an optical communication module using optical fiber retainers of the present invention.

FIG. 2 is a schematic cross sectional view showing a configuration of an optical communication module 50.

As shown in FIG. 2, the body 51 of the optical communication module 50 is provided with three optical fiber retainers 10 described above, and an optical fiber retainer 100 is secured to each of the respective cases 51a, 51b, and 51c of the optical fiber retainers 10. Furthermore, the optical fiber module 50 includes an optical filter 30.

The cases 51a and 51b are disposed at a predetermined interval on an identical plane of the body of the optical communication module. The tips 100c of the cases 51a and 51b are disposed in opposition to each other such that the extensions of the optical axes of the optical fibers 100 contained therein match.

For the mounting positions of the cases 51a and 51b, the case 51c is placed perpendicular to between the cases 51a and 51b. The tip 100c of the optical fiber 100 secured to the case 51c is mounted toward a point 0, which is at an equal distance from the cases 51a and 51b.

In this way, the cases 51a, 51b, and 51c are integrally mounted in the body of the optical communication module.

The optical filter 30 is disposed at a point 0 which is at an equal distance from the above described cases 51a and 51b, and also at the equal distance from the case 51c. In the optical filter 30 are formed a first face 30a and a second face 30b. The optical filter 30 is disposed in a slanting direction such that the first face 30a faces the cases 51a and 51c and the second face 30b faces the case 51b. In other words, the tips 100c of optical fibers 100 secured to the cases 51a and 51c are disposed toward the first face 30a of the optical filter 30 and the tip 100c of an optical fiber 100 secured to the case 51b toward the second face 30b.

In the optical communication module 50 thus constructed, light incident on the optical fiber 100 secured to the case 51a of the first optical fiber retainer 10 from the outside transmits through the light guide part 100a, is gathered by a lens of the tip 100c of the light guide part 100a, and is incident on the optical filter 30. The optical filter 30 allows light of a specific wavelength band to pass into the tip 100c of the optical fiber 100 secured to the case 51b of the second optical fiber retainer 10. On the other hand, of the transmitted light, light of other wavelength bands reflects at right angles in the optical filter 30 and is incident on the tip 100c of the optical fiber 100 secured to the case 51c of the third optical fiber retainer 10.

By thus constructing the optical communication module 50, the optical fibers 100 are accurately positioned in the X-axis, Y-axis, and Z-axis directions thereof and light is entered and emitted, over a predetermined distance, to and from the optical filter 30 by the lenses provided at the tips 100c of the optical fibers 100, so that the light can be transmitted with a minimum of light output loss due to misalignment of the optical axes.

The optical communication module 50 thus constructed is used as a connector module during a branch to two or more optical fibers 100 in light communication.

Next, a description will be made of an optical communication module using an optical fiber retainer 10 of the present invention.

Figure 3:
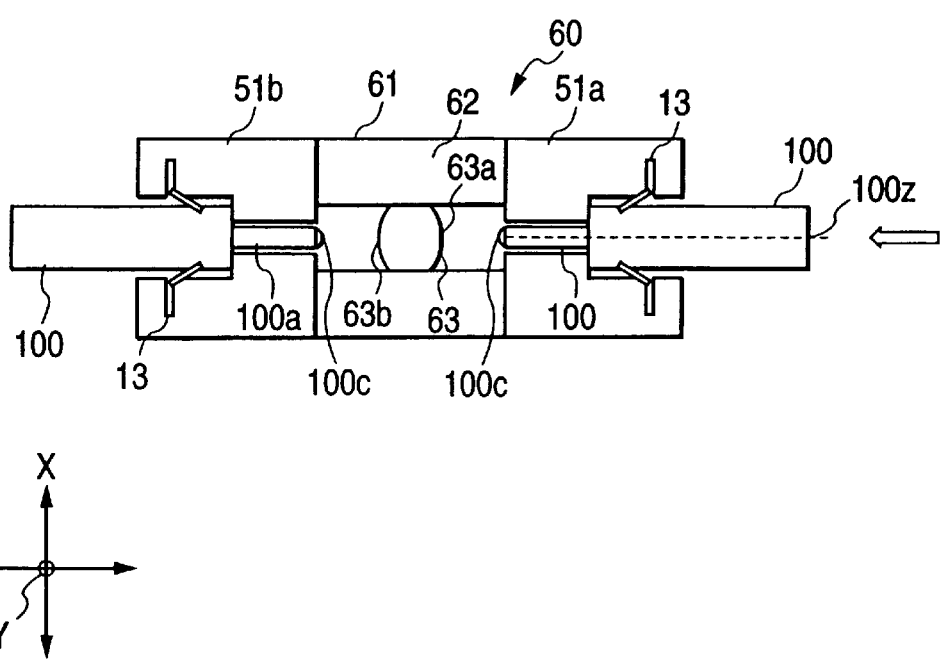
FIG. 3 is a schematic cross sectional view showing a configuration of another optical communication module using optical fiber retainers of the present invention.

FIG. 3 is a schematic cross sectional view showing a configuration of an optical communication module 60.

As shown in FIG. 3, a second optical communication module 60 comprises cases 51a and 51b, and a tubed lens part 61 sandwiched between the cases 51a and 51b.

The tubed lens part 61 comprises a cylindrical, metallic lens tube 62, and a lens 63 housed integrally within the lens tube 62.

The lens 63 is formed of a first spherical surface 63a and a second spherical surface 63b made of a glass or plastic material.

The tubed lens part 61 is switched and secured between the cases 51a and 51b such that the optical axis of the lens 63 overlaps with extensions of the cores 100z of optical fibers 100 of the cases 51a and 51b.

The tips 100c of optical fibers 100 disposed in the cases 51a and 51b, which are in the shape of lens, are positioned such that focal distances from the first and second spherical surfaces 63a and 63b of the lens 63 are a fixed value.

In the second optical communication module 60 thus constructed, light incident on the optical fiber 100 of the case 51a from the outside transmits through the light guide part 100a, is gathered by a lens of the tip 100cthereof, and is emitted to the first spherical surface 63a. The light is incident from the second spherical surface 63b on the tip 100c of the optical fiber 100 secured to the case 51b. The light incident on the tip 100c is gathered by a lens and is transmitted through the light guide part 100a and into the other end of the optical fiber 100.

The tips 100c of the optical fibers 100 secured to the cases 51a and 51b are disposed at a predetermined interval in opposition to the spherical surfaces 63a and 63b of the lens 63, respectively, whereby the optical axis of the lens 63, which is an optical part, and the center of the core 100z of the optical fiber 100 are accurately positioned up and down, back and forth, and left and right (X, Y, and Z axes), and light can be transmitted with a minimum of light loss due to misalignment of the optical axes, with the tubed lens part 61 sandwiched.

The mounting parts of the cases 51a and 51b respectively including the optical fiber retainer 10, and the tubed lens part 61 are accurately formed such that they are correctly positioned, so that the optical fibers 100 have only to be inserted in the cases 51a and 51b including the optical fiber retainer 10.

Such a second optical communication module 60, when a crystal glass fiber with small transmission loss is used as an optical fiber 100 secured to the case 51a and a plastic fiber larger in transmission loss but cheaper than a crystal glass fiber is used as an optical fiber 100 secured to the case 51b, is used as a connector module during a branch to base stations such as a home from between optical fibers for making connections between remote sites.

Connections between the two different optical fibers as described above can be made with a minimum of light transmission loss even if an amplifier required to amplify light quantity lost by transmission is not provided.

In building an optical communication network to homes that is expected to come into widespread use more and more in future, use of the described above second optical module 60 will help to reduce costs because desired optical communications can be performed using inexpensive plastic fibers.

As described above, the optical fiber retainer comprises a case having a bottom wall and an optical fiber inserted in the case, a light guide part of the optical fiber is engaged in a through hole provided in the bottom wall to position the optical fiber in the case, the light guide part being uncovered by stripping a protective jacket from the tip of the optical fiber, whereby the case and an optical part correctly formed a predetermined distance away from the case are positioned, so that positioning in a direction perpendicular to the optical fiber can be performed simply by inserting the optical fiber in the case, and thereby light transmission loss in optical communication can be suppressed.

Furthermore, the end face of the protective jacket is brought into intimate contact with the bottom plate face of the bottom wall, whereby the optical fiber can be accurately positioned in the insertion direction thereof, and therefore light transmission loss in optical communication can be further suppressed.

Furthermore, the optical fiber retainer comprises a case having a bottom wall, a sleeve having a fiber insertion hole inserted within the case, a plate spring, and an optical fiber, the optical fiber whose light guide part is uncovered by stripping a protective jacket from the tip thereof is inserted in the fiber insertion hole, the light guide part is engaged in a through hole provided in the bottom wall, the plate spring engages in the surface of the protective jacket of the optical fiber to prevent the optical fiber from being disconnected, and the sleeve is driven in the insertion direction of the optical fiber to disengage the plate spring from the optical fiber, whereby the optical fiber can be inserted or removed in or from the case like a so-called receptacle, and the accuracy of securing the optical fiber to the case can be increased.

What is claimed is:

1. An optical fiber retainer of an optical communication module comprising a case having a bottom wall formed with a mounting reference face perpendicular to an inserting direction of an optical fiber in which a sleeve having the optical fiber inserted therein is movably inserted in the case in a direction of a center of axis of the case;

wherein said case is provided with a first engaging step and a second engaging step protruding inwardly from a side wall of the case and spaced apart in the direction of the center axis to form a first cavity between the bottom wall of said case and said first engaging step in said case, and to form a second cavity between said first engaging step and the second engaging step, and said bottom wall of said case has in the direction of the center axis a through hole for fitting a light guide part exposed by peeling off a protective part at an extreme end of said optical fiber;

wherein said sleeve is comprised of a plate spring having a hole through which the optical fiber is inserted, and a retainer protruding outwardly from an outer circumferential surface of said sleeve, said sleeve being movable in an axial direction of said case within said second cavity of said case and further arranged and fixed in said first cavity of said case;

wherein said plate spring is composed of a circular metallic plate, a central part of said metallic being formed with an opening through which said optical fiber is inserted and passed, and a plurality of resilient tongue-shaped locking claws being disposed about said opening, said plurality of locking claws having an anchoring function for preventing the optical fiber inserted through said opening from being moved in a direction opposite to its inserting direction; and wherein the optical fiber is inserted into said sleeve;

wherein when said optical fiber is to be fixed to said case, the optical fiber having the protective part at the extreme end thereof peeled off to expose said light guide part is inserted into said insertion hole of said sleeve, and further inserted into and passed through said opening of said plate spring while said plurality of locking claws of said plate spring are being expanded, said light guide part being fitted to said through hole provided in said bottom wall and an extreme end surface of the protective part of said optical fiber being abutted against said mounting reference around said through hole of said case, and said plurality of locking claws of said plate spring are bitten into the surface of said protective part of said optical fiber to prevent said optical fiber from being removed in a direction opposite to its inserting direction, said plurality of locking claws pushing the extreme end of said optical fiber in a direction that is reverse to the inserting direction to cause said retainer part of said sleeve to be abutted against said second engaging step of said case and thereby fixing said sleeve to said case, and wherein when said optical fiber is to be removed from said case, said sleeve is driven in the inserting direction of said optical fiber to cause said retainer part of said sleeve to move in said second cavity of said case so that said inserting extreme end of said sleeve causes the plurality of locking claws of said plate spring to be expanded, thereby releasing the bitten state between said plate spring and said optical fiber so that said optical fiber can be pulled out of said sleeve.

2. An optical fiber retainer of an optical communication module according to claim 1, wherein said exposed light guide part is formed with a lens surface at the extreme end of said optical fiber.

* * * * *